United States Patent
Macura et al.

(10) Patent No.: US 8,215,642 B2
(45) Date of Patent: Jul. 10, 2012

(54) INTERACTIVE MODULAR TILE SYSTEM

(75) Inventors: Marko Macura, Eindhoven (NL);
Thomas Marzano, Eindhoven (NL);
Hubertus Cornelius Antonius Dirkx, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 192 days.

(21) Appl. No.: 12/442,426

(22) PCT Filed: Oct. 1, 2007

(86) PCT No.: PCT/IB2007/053985
§ 371 (c)(1),
(2), (4) Date: Nov. 10, 2009

(87) PCT Pub. No.: WO2008/041175
PCT Pub. Date: Apr. 10, 2008

(65) Prior Publication Data
US 2010/0052253 A1    Mar. 4, 2010

(30) Foreign Application Priority Data
Oct. 2, 2006    (EP) ................................. 06121612

(51) Int. Cl.
*A63F 9/00*    (2006.01)
(52) U.S. Cl. ....................... 273/309; 273/237
(58) Field of Classification Search ............ 273/237, 273/286, 309; 473/414
See application file for complete search history.

(56) References Cited

U.S. PATENT DOCUMENTS

| | | | |
|---|---|---|---|
| 3,922,944 A | 12/1975 | Kurosaki et al. | |
| 4,359,220 A * | 11/1982 | Morrison et al. | 463/9 |
| 5,190,285 A * | 3/1993 | Levy et al. | 463/36 |
| 5,589,654 A * | 12/1996 | Konwiser et al. | 84/600 |
| 5,839,976 A * | 11/1998 | Darr | 473/414 |
| 6,102,397 A * | 8/2000 | Lee et al. | 273/238 |
| 6,443,796 B1 * | 9/2002 | Shackelford | 446/91 |
| 6,568,683 B1 * | 5/2003 | Harpaz | 273/460 |
| 7,008,316 B1 * | 3/2006 | Pugh | 463/10 |
| 2003/0158176 A1 | 8/2003 | Richards et al. | |
| 2004/0229696 A1 | 11/2004 | Beck | |

FOREIGN PATENT DOCUMENTS
DE    9215659 U1    4/1993
FR    2860985 A1    4/2005

OTHER PUBLICATIONS
"Chess Variant"; Wikipedia, Oct. 1, 2006, Retrieved From the Internet:http://en.wikipedia.org/w/index.php?title=Chess_variant&diff=78816222&oldid=78726910>.

* cited by examiner

*Primary Examiner* — Corbett B Coburn

(57) ABSTRACT

The interactive modular tile system of the invention comprises a plurality of modular interactive tiles (11, 13). The system comprises electronic circuitry which is operative to determine a configuration of the plurality of modular interactive tiles, and determine whether a game can be played, which game can be played and/or which variation of a game can be played with the determined configuration. The computer program product of the invention enables a programmable device to function as the interactive modular tile system of the invention.

10 Claims, 2 Drawing Sheets

INTERACTIVE MODULAR TILE SYSTEM

FIELD OF THE INVENTION

The invention relates to an interactive system for playing games on a floor, the system comprising electronic circuitry.

The invention further relates to a computer program product enabling a programmable device to function as an interactive system for playing games on a floor.

BACKGROUND OF THE INVENTION

Examples of such an interactive system are the various dance mats that are being sold, for example Konami's Dance Dance Revolution. These dance mats have a fixed configuration of interaction points and allow dancing games to be played on them. It is a drawback of these dance mats that the games that can be played on them is very limited.

SUMMARY OF THE INVENTION

It is an object of the invention to provide an interactive system for playing various games on a floor.

According to the invention, the object is realized in that the interactive system is an interactive modular tile system which comprises a plurality of modular interactive tiles, the system comprising electronic circuitry, the electronic circuitry being operative to determine a configuration of the plurality of modular interactive tiles and determine whether a game can be played, which game can be played and/or which variation of a game can be played with the determined configuration. This system allows various floor-based games to be played. Because not all floor-based games will be able to handle all different configurations of tiles, it will depend on the configuration whether a game can be played, which game can be played and/or which variation of a game can be played. Interacting with the tiles requires physical activity like stepping on the tiles, jumping from tile to tile, picking up and reconfiguring tiles.

In an embodiment of the system of the invention, the electronic circuitry indicates where at least one of the plurality tiles should be placed in order to play a certain game or a certain variation of a game. The system thus gives hints how to make a configuration for a desired game or game variation.

At least one of the plurality of tiles may indicate that a further tile should be placed next to the one tile in order to play the certain game or the certain variation of the game. A tile or a side of a tile may start blinking (possibly in a certain color).

The plurality of tiles may be hexagonal in shape. This allows the creation of many different configurations.

One of the plurality of tiles may act as a master tile having a main power supply. The master tile may also have a loudspeaker. By incorporating certain expensive components into the master tile and protecting the master tile extra against damage, the durability of the system is improved.

At least some of the tiles may comprise lights and/or displays. Although it is possible to give users feedback via a televisions screen, it is easier for users to receive feedback via the tiles themselves, e.g. with light signals or even texts and images.

The tiles may have connectors allowing the master tile and further ones of the tiles to be stacked and allowing batteries of the further ones of the tiles to be charged when the master tile and the further ones of the tiles are stacked. This ensures that the batteries of the tiles are reloaded when the tiles are put away. The lights and/or displays of the tiles may light up while the batteries are reloading.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
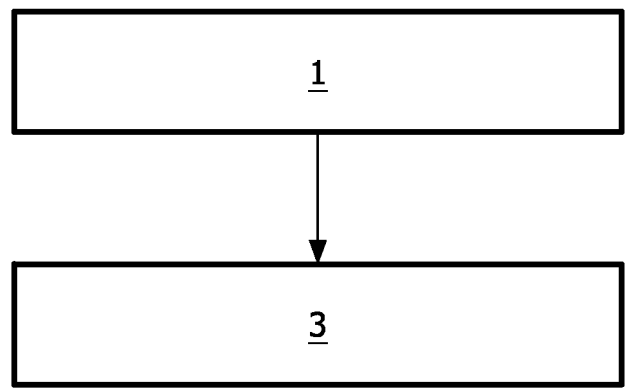
FIG. 1 is a flow diagram of the method of the invention.

The method of the invention comprises two steps, see FIG. 1. A step 1 comprises determining a configuration of a plurality of modular interactive tiles. A step 3 comprises determining whether a game can be played, which game can be played and/or which variation of a game can be played with the determined configuration.

Figure 2:
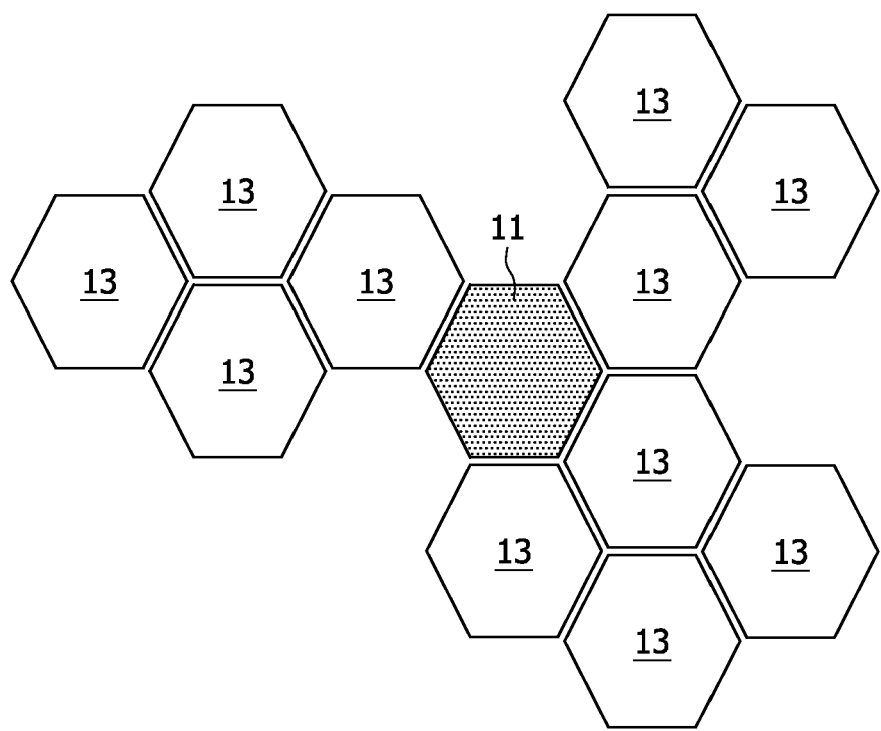
FIG. 2 shows an embodiment of the interactive modular tile system of the invention.

FIG. 2 shows an embodiment of the system which has one master tile 11 and eleven other tiles 13, called "play tiles". All tiles have a hexagonal shape. To start to play a game a layout needs to be made with the 11 play tiles. When connecting the tiles a little light burst is visible on the edge of the tiles, to confirm the connection. When the total layout of the play tiles is made, the master tile needs to be connected to power on.

The master tile has the intelligence, power and speaker. On connection with the play tiles a burst of light originates from the master tile into and over all of the play tiles, to indicate the power on. After power on, on each of the tiles an icon of a game is displayed that can be chosen to play by stepping on that tile. After this point the game will start with its game specific directions and finally the game itself. To reset and choose another game, disconnect and reconnect the master tile.

After having chosen a game that requires a specific tile layout, the system will indicate which tiles to move and where. To end a game, just remove the master tile. Stacking all the tiles on top of the master tile will charge the play tiles. To play specific games like "hopscotch" where it is needed to throw an indicator on the tiles, the system comes with 2 pucks. These are beanbag like objects with LED's inside that can be thrown onto the tiles.

The following objects are available in this embodiment (other embodiments may have different objects, e.g. no fixed play tiles):

7 fixed Play tiles (+2 spare)
The 7 play tiles are finished in soft material and will each have 169 LED's grid layout under the top surface. When connecting to each other, they will light up on the sides that are being connected to each other. The tiles also have tact switches, so they can sense when someone is standing on them. Each game will have a specific behavior for the tiles.

4 loose Play tiles (+1 spare)
The 4 loose tiles are identical to the 7 fixed tiles, apart from the fact that they are wireless and can be lifted to rearrange the layout. The wireless data transfer will be done through with IR through the floor. Power will be through the magnets 1 loose Master tile
The master tile preferably has the intelligence, power and speaker. The top layer can be finished in glossy Perspex.

When the master tile is connected to other tiles, a burst of light will originate from it and animate over all the play tiles.

2 pucks

Two beanbag like pucks that will be detected when thrown on the tiles.

To start to play all the tiles need to be laid out first. When connecting to each other, they will light up on the sides that are being connected, to indicate connection. To power up the tiles, the master is connected. On connection a pulse of light originates from the master tile and animates over all of the other tiles.

After this initial pulse, on each tile an icon will appear. Each icon represents a game that can be chosen to play. To choose one of the games a user needs to step on the tile that has the icon of the game he wants to play. This tile is then highlighted. After a 3 second time-out that starts after the last selection, the choice is confirmed. This time out time can be made visual & audible on the tiles. After time out on all tiles, there can be a visual confirmation.

If the chosen game requires a specific layout (hopscotch), the tiles need to be reconfigured. The tiles that need to be moved will dim and the tiles that are already in the correct position will glow. To guide you, the sides where a tiles needs to be connected to will be highlighted in a color. When a new tile is connected correctly, also this one will glow like the other tiles. When the new layout is completed, on all the tiles, there is a visual confirmation.

After a short transition, all the tiles light up in different colors. To choose the amount of players and the color that will represent each individual player, each player steps on the tile that has the color they want, the tiles that are being stepped on will highlight. After a 3 second time-out that starts after the last selection, the choice is confirmed. This time out time can be made visual & audible on the tiles. After time out on all tiles, there can be a visual confirmation.

After a short transition, the tile on which to start the game will glow in one of the player's colors, indicating that that player is up. After the player stands on this tile, the game starts. To reset a game, the master tile should be disconnected and reconnected. To shut down a game, the master tile should be disconnected.

Game 01: Simon says

This game uses tones and lights. The system will play a series of tones and light up the tiles in different colors (only one to begin with). On one of the tiles the color of the first player appears. To start his turn the player has to stand on this tile. After a few seconds the first pattern will start. The players must then repeat what the system did and return to the start tile. The game progresses by adding a new tone to the sequence every turn. When the player misses when repeating the sequence he is out and an animation on all the tiles will highlight this. The next player then is up. The game keeps playing until reset.

Game 02: Hopscotch

The first player throws his puck inside square one. After that, he has to hop into each square, starting with square 1 and ending in square 10.

If there are two squares together, he jumps, landing with one foot in each square; but if there is only one square, he must hop on one foot.

When he reaches square number 10, he has to turn back jumping again until square number 1. Then he can continue playing the next level.

This time the player begins by throwing the stone into square number 2. In the next level, he throws it into square number 3. He can continue until level 10.

The first player who does all the levels is the winner. The most important thing is that the player has to skip the square where the stone is.

The game has some rules. If one of the following things happens, the player has to stop and another player takes a turn.

Figure 3:
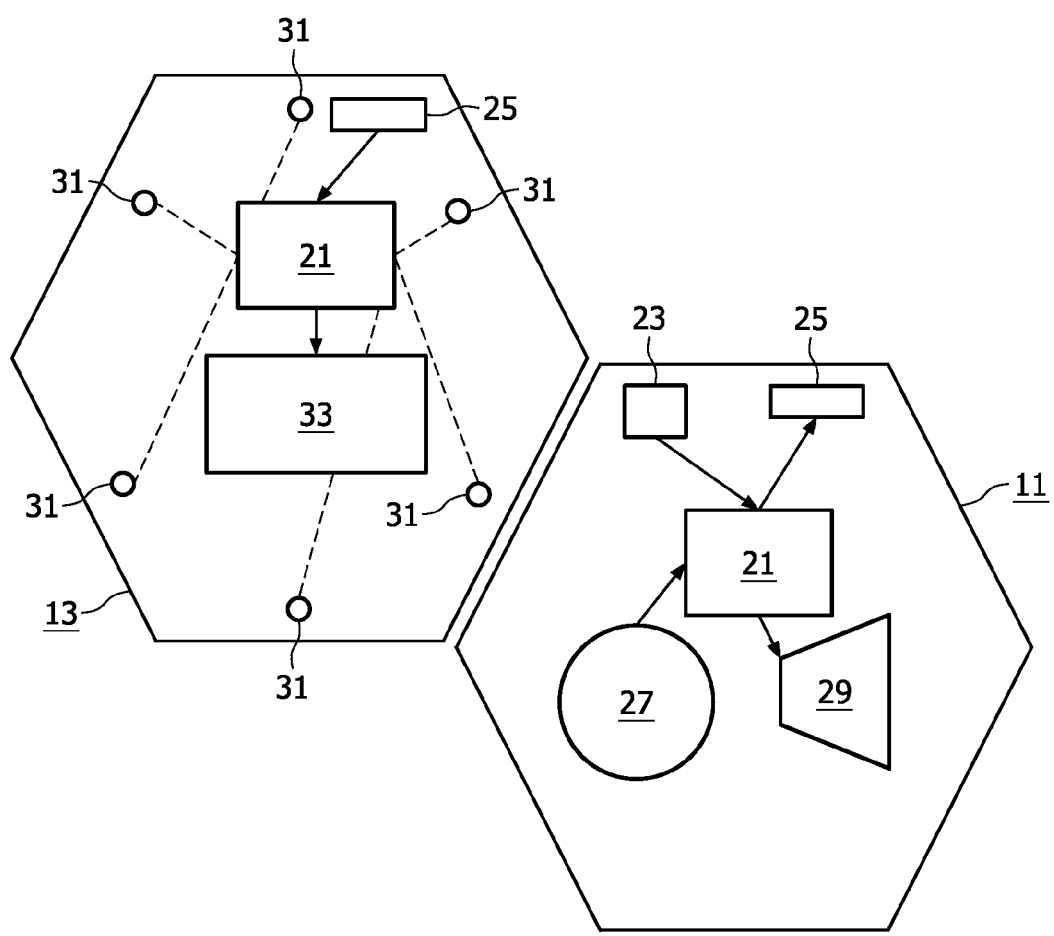
FIG. 3 shows a block diagram of two of the tiles of FIG. 2.

1. The player can't put his/her foot or feet on the lines of the square.
2. The player can't jump with two feet in squares 1, 4, 7, and 10.
3. The player can't fall down.
4. The player cannot miss the square with the puck The master tile 11 comprises the electronic circuitry 21, see FIG. 3. The electronic circuitry 21 is operative to determine a configuration of the plurality of modular interactive tiles and determine whether a game can be played, which game can be played and/or which variation of a game can be played with the determined configuration. The electronic circuitry 21 may comprise a general-purpose or application-specific processor. The master tile 11 further comprises a main power supply 23, which can be connected to 110 Volt or 220 Volt, for example. The master tile 11 further comprises a power connector 25 for supplying power to other tiles, e.g. by using induction. The master tile 11 further comprises a storage means 27 for storing games. The master tile 11 further comprises a speaker 29 for reproducing audio of the games.

The play tile 13 comprises six sensors 31, one for each side, for detecting where others tiles are connected. With this information, the configuration of the tiles can be determined. The pay tile 13 further comprises a power connector 25 for receiving power from the master tile 11, e.g. through induction, and reloading a battery when the power connector 25 of the play tile 13 is coupled to the power connector 25 of the master tile 11. The play tile 13 further comprises an input means 33, possible combined with a light or a display. The electronic circuitry of play tile 13 receives the data from the sensors 31 and from the input means 33.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. An interactive modular tile system comprising:
   a plurality of modular interactive floor tiles, the plurality of modular interactive floor tiles including one master tile and a number of play tiles, capable of being arranged in a plurality of game layout configurations with the play tiles connected to each other on their sides and the master tile, wherein responsive to a connection of the master tile to the play tiles, the play tiles are powered up; and,
   electronic circuitry being operative to:
   determine a configuration of the plurality of modular interactive floor tiles; and
   determine whether a particular game selected from a set of games can be played with the determined configuration.

2. The interactive modular tile system as claimed in claim 1, wherein the electronic circuitry indicates where at least one of the plurality floor tiles should be placed in order to play a certain game selected from the set of games.

3. The interactive modular tile system as claimed in claim 2, wherein at least one of the plurality of floor tiles indicates that a further floor tile should be placed next to the one floor tile in order to play the certain game.

4. The interactive modular tile system as claimed in claim 2, wherein the at least one of the plurality of floor tiles contains at least one light indicator that will glow upon its proper placement.

5. The interactive modular tile system as claimed in claim 1, wherein the plurality of floor tiles are hexagonal in shape.

6. The interactive modular tile system as claimed in claim 1, wherein one of the plurality of floor tiles acts as a master tile having a main power supply.

7. The interactive modular tile system as claimed in claim 1, wherein at least some of the floor tiles comprise lights and/or displays.

8. The interactive modular tile system as claimed in claim 1, wherein the set of games comprises one or more variations of a particular game.

9. An interactive modular tile system comprising:
   a plurality of modular interactive floor tiles, capable of being arranged in a plurality of configurations; and
   electronic circuitry being operative to:
   determine a configuration of the plurality of modular interactive floor tiles; and
   determine whether a particular game selected from a set of games can be played with the determined configuration, wherein one of the plurality of floor tiles acts as a master tile having a main power supply, and wherein the floor tiles have connectors allowing the master tile and further ones of the floor tiles to be stacked and allowing batteries of the further ones of the floor tiles to be charged with the master tile.

10. A non-transitory computer readable storage medium comprising a computer program for use in arranging interactive floor tiles in a plurality of configurations, said program including a set of instructions executable by a processor, the medium comprising:
    code for determining a configuration of the plurality of modular interactive floor tiles, the plurality of modular interactive floor tiles including one master tile and a number of play tiles, capable of being arranged in a plurality of game layout configurations with the play tiles connected to each other on their sides and the master tile, wherein responsive to a connection of the master tile to the play tiles, the play tiles are powered up; and,
    code for determining whether a particular game selected from a set of games can be played with the determined configuration.

* * * * *